United States Patent
Heckenberger et al.

(10) Patent No.: US 9,083,009 B2
(45) Date of Patent: Jul. 14, 2015

(54) METHOD FOR PRODUCING AN ENERGY STORAGE DEVICE HOLDER FOR A VEHICLE

(75) Inventors: Thomas Heckenberger, Leinfelden-Echterdingen (DE); Tobias Isermeyer, Stuttgart (DE); Markus Kohlberger, Stuttgart (DE); Thomas Schiehlen, Altheim (DE); Hans-Georg Herrmann, Stuttgart (DE); Christoph Fehrenbacher, Stuttgart (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 179 days.

(21) Appl. No.: 13/417,793

(22) Filed: Mar. 12, 2012

(65) Prior Publication Data
US 2012/0227931 A1 Sep. 13, 2012

Related U.S. Application Data

(63) Continuation of application No. PCT/EP2010/062935, filed on Sep. 3, 2010.

(30) Foreign Application Priority Data

Sep. 10, 2009 (DE) .......... 10 2009 040 814

(51) Int. Cl.
| | |
|---|---|
| H01M 2/02 | (2006.01) |
| H01M 10/6556 | (2014.01) |
| B23P 15/26 | (2006.01) |
| B21D 53/04 | (2006.01) |
| H01M 2/20 | (2006.01) |

(Continued)

(52) U.S. Cl.
CPC ............ *H01M 2/021* (2013.01); *H01M 2/0275* (2013.01); *H01M 2/206* (2013.01); *H01M 10/04* (2013.01); *H01M 10/5004* (2013.01); *H01M 10/5016* (2013.01); *H01M 10/5057* (2013.01); *H01M 10/052* (2013.01); *H01M 10/5032* (2013.01); *Y02T 10/7011* (2013.01); *Y10T 29/49359* (2015.01)

(58) Field of Classification Search
CPC ........ B23P 15/26; B21D 53/04; B21D 53/02; B62M 6/90; H01M 2220/20; H01M 2/1083
USPC ............. 29/890.03, 890.035; 180/207.3, 68.5
See application file for complete search history.

(56) References Cited

U.S. PATENT DOCUMENTS

| | | | | |
|---|---|---|---|---|
| 4,535,863 | A | * | 8/1985 | Becker .......................... 180/68.5 |
| 5,756,227 | A | | 5/1998 | Suzuki et al. |

(Continued)

FOREIGN PATENT DOCUMENTS

| | | |
|---|---|---|
| DE | 698 39 213 T2 | 3/2009 |
| DE | 102007063269 A1 * | 6/2009 |

(Continued)

*Primary Examiner* — Sarang Afzali
(74) *Attorney, Agent, or Firm* — Muncy, Geissler, Olds & Lowe, P.C.

(57) ABSTRACT

A method comprising a step of providing a cooling plate having at least one exposed cooling channel designed for guiding a cooling fluid. The method further comprises a step of providing a mounting unit designed for receiving and fixing at least one energy storage unit. The method finally comprises a step of connecting the cooling plate to the mounting unit, whereby the at least one cooling channel is closed.

3 Claims, 6 Drawing Sheets

(51) Int. Cl.
 *H01M 10/04*   (2006.01)
 *H01M 10/613*  (2014.01)
 *H01M 10/625*  (2014.01)
 *H01M 10/052*  (2010.01)
 *H01M 10/647*  (2014.01)

(56) References Cited

U.S. PATENT DOCUMENTS

| | | | |
|---|---|---|---|
| 5,985,483 A * | 11/1999 | Verhoog et al. | 429/120 |
| 6,569,556 B2 * | 5/2003 | Zhou et al. | 429/88 |
| 6,632,560 B1 * | 10/2003 | Zhou et al. | 429/99 |
| 6,972,957 B2 * | 12/2005 | Beihoff et al. | 361/698 |
| 7,079,379 B2 * | 7/2006 | Yamaguchi et al. | 361/676 |
| 7,485,983 B2 | 2/2009 | Asao et al. | |
| 7,531,270 B2 * | 5/2009 | Buck et al. | 429/120 |
| 7,892,671 B2 * | 2/2011 | Hamery et al. | 429/120 |
| 7,997,367 B2 * | 8/2011 | Nakamura | 180/68.5 |
| 8,387,733 B2 * | 3/2013 | Nakamura | 180/68.5 |
| 8,399,118 B2 * | 3/2013 | Gadawski et al. | 429/120 |
| 8,403,030 B2 * | 3/2013 | Payne | 165/80.4 |
| 8,403,090 B2 * | 3/2013 | Fujiwara et al. | 180/68.5 |
| 2002/0012833 A1 | 1/2002 | Gow et al. | |
| 2006/0214641 A1 * | 9/2006 | Cho | 320/150 |
| 2007/0114083 A1 * | 5/2007 | Asao et al. | 180/68.5 |
| 2007/0178377 A1 * | 8/2007 | Kim et al. | 429/152 |
| 2007/0240867 A1 * | 10/2007 | Amano et al. | 165/168 |
| 2009/0142653 A1 * | 6/2009 | Okada et al. | 429/120 |
| 2009/0220852 A1 * | 9/2009 | Fujii | 429/72 |
| 2010/0112424 A1 | 5/2010 | Hayashi | |
| 2010/0163325 A1 * | 7/2010 | Nakamura | 180/68.5 |
| 2010/0236854 A1 * | 9/2010 | Nakamura | 180/68.5 |
| 2010/0276132 A1 * | 11/2010 | Payne | 165/169 |
| 2011/0244298 A1 | 10/2011 | Guener et al. | |

FOREIGN PATENT DOCUMENTS

| | | |
|---|---|---|
| DE | 10 2008 010 838 A1 | 8/2009 |
| DE | 10 2008 057 210 A1 | 5/2010 |
| EP | 1 818 998 A2 | 8/2007 |
| JP | H 08-148187 A | 6/1996 |
| JP | H 11-354166 A | 12/1999 |
| JP | 2002-134177 A | 5/2002 |
| JP | 2004-291891 A | 10/2004 |
| JP | 2006-278330 A | 10/2006 |
| JP | 2007-012486 A | 1/2007 |
| JP | 2008-059950 A | 3/2008 |
| JP | 2008-192551 A | 8/2008 |
| JP | 20100009962 A | 1/2010 |
| WO | WO 2006/093010 A1 | 9/2006 |
| WO | WO 2009/080270 A2 | 7/2009 |

\* cited by examiner

METHOD FOR PRODUCING AN ENERGY STORAGE DEVICE HOLDER FOR A VEHICLE

This nonprovisional application is a continuation of International Application No. PCT/EP2010/062935, which was filed on Sep. 3, 2010, and which claims priority to German Patent Application No. DE 10 2009 040 814.2, which was filed in Germany on Sep. 10, 2009, and which are both herein incorporated by reference.

BACKGROUND OF THE INVENTION

1. Field of the Invention

The present invention relates to a method for producing a holder for an energy storage device.

2. Description of the Background Art

In modern HEV/EV vehicles (HEV=hybrid electric vehicle, EV=electric vehicle), Li-ion (lithium-ion) rechargeable batteries are likely to be used as energy storage devices in future. In these batteries, heating of the cells takes place during fast charging and discharging because of resistances both inside and outside the cells. However, temperatures above 50° C. damage these battery or rechargeable battery cells over the long term; for this reason, the cells should be cooled during operation. An attachment of a battery housing or rechargeable battery housing to a vehicle structure should be taken into consideration here. In this context, an attachment of these rechargeables or batteries should be designed as a car body-specific component in order to be able to be built into the vehicle easily. In the particular case, integration of a battery housing in the Smart car EV can be considered as an example. The primary focus here is on the dimensions and the mass of the battery cells.

For use in HEVs or EVs, essentially three different housing types for secondary Li-ion or Li polymer cells come into consideration: round cells with a hard housing; prismatic cells with a hard housing; or prismatic cells with a soft case made of aluminum composite film, so-called coffee bag cells.

Modern lithium-ion (rechargeable) cells are packed in a deep-drawn and/or welded housing of aluminum (generally with a wall thickness of 200-400 μm). Normally, the individual cells are then mounted on heat sinks (by gluing, for example). These heat sinks, in turn, are attached to a cooling plate (liquid cooling, evaporator plate, or tube evaporator), by which means the rechargeable cells can be cooled in operation.

While cells with a hard housing can be attached directly to the cooling plate by their top, bottom, or jacket, cells with an aluminum composite film require a heat sink for mechanical attachment. Some of the advantages with regard to weight and cost are negated as a result of these additionally required heat sinks. Moreover, the heat transfer from the cell to the heat sink is degraded by the adhesive layer.

Current battery housing concepts, due to the cell dimensions, are cumbersome and are not specifically tailored to the vehicle structure. As a result, attachment in the existing vehicle architecture is difficult, and generally is associated, with sacrifices in installation space or inefficient utilization of cubic volume.

SUMMARY OF THE INVENTION

It is therefore an object of the present invention is to create an improved method for producing an energy storage device holder, and to create a corresponding device for holding an energy storage unit.

In an embodiment, the present invention creates a method for producing an energy storage device holder for a vehicle, wherein the method has the following steps: provision of a cooling plate with at least one exposed cooling channel that is designed to carry a cooling fluid; provision of a holder unit that is designed to accommodate and secure at least one energy storage unit; and connection of the cooling plate to the holder unit, by which means the at least one cooling channel is closed.

In addition, the invention creates in an embodiment a method for producing an energy storage device holder for a vehicle, wherein the method has the following steps: provision of a holder unit that is designed to accommodate and secure at least one energy storage unit, and that has a base plate that includes at least one exposed cooling channel that is designed to carry a cooling fluid; provision of a cooling plate; and connection of the cooling plate to the holder unit, by which means the at least one exposed cooling channel is closed.

The present invention also creates a device for holding an energy storage unit for a vehicle that was produced by carrying out the steps of a method according to one of the preceding claims.

The present invention is based on the finding that a combination of the functions "cooling" and "housing" can be carried out while saving material by the means that the at least one cooling channel is closed when the cooling plate and the holder unit are connected. A cooling fluid can then flow through this channel during operation of the energy storage device holder. In this way, it is possible to avoid the need to first manufacture a cooling plate with a fully fluid-tight channel and to then connect this cooling plate to the holder unit. In this way, it is possible to save material for sealing the cooling channel, or for sealing the individual cooling channels when multiple cooling channels are used in the cooling plate or in the holder unit's base plate.

The present invention thus offers the advantage that it is possible to achieve both a weight reduction in the energy storage device holder and a cost reduction by reducing the material to be used.

It is beneficial if, furthermore, a step of providing an additional cooling plate is included, wherein the additional cooling plate has at least one additional exposed cooling channel, and wherein, furthermore, the additional exposed cooling channel in the additional cooling plate is closed by a side surface of the holder unit during the connection step, or wherein, during the step of providing the holder unit, a holder unit is provided that has at least one additional exposed cooling channel that also is closed by an additional provided cooling plate during the connection step. The advantage offered by such an embodiment of the present invention is that not only is cooling provided on one side of the holder unit, but also at least one energy storage element that can be arranged in the energy storage device holder can be cooled from multiple sides. In this design, the advantages according to the invention are exploited in that a weight reduction and a saving of material can be realized as compared to conventional energy storage device holders.

In another embodiment of the present invention, during the step of providing the cooling plate, a cooling plate can be provided that has a metal or metal constituents, in particular steel, aluminum, magnesium, titanium, or a plastic/metal hybrid, or in which, during the step of providing the holder unit, a holder unit with a base plate is provided wherein the base plate has a metal or metal constituents, in particular steel, aluminum, magnesium, titanium, or a plastic/metal hybrid. Such an embodiment of the present invention offers the advantage that metal, in particular the said metals, have very good thermal conductivity, so that a high heat removal rate is possible, and thus good cooling is possible of energy storage elements that can be arranged in the energy storage device holder.

Also, a method for producing an energy storage device holder can be provided that has the following steps: the steps of one of the above-described embodiments of the method for producing an energy storage device holder; and insertion of at least one energy storage element in the holder unit in order to produce the energy storage unit.

Such an embodiment of the present invention offers the advantage that the energy storage unit can be filled with energy storage elements in a simple manner and they can be attached securely in the holder unit. Especially for applications in a vehicle, such a secure construction is advantageous, since vibrations during travel should not then lead to shifting or damage of the energy storage elements in the holder unit.

It is advantageous if in addition, the method includes a step of providing an additional cooling plate, wherein the additional cooling plate has at least one opening, and wherein the method additionally has a step of mounting the additional cooling plate on the holder unit in such a manner that, after the mounting step, a contact terminal of the at least one energy storage element can be contacted through the at least one opening in the at least one cooling plate. Such an embodiment of the present invention offers the advantage that a very good cooling opportunity or heat removal rate for the energy storage elements located in the holder unit is made possible by the cooling plates located around the energy storage elements on multiple sides.

It is also beneficial if a plurality of energy storage elements are inserted in direct contact next to one another in the holder unit during the insertion step, and wherein the energy storage units are inserted in the holder unit during the insertion step in such a manner that establishment of an electrical contact to contact terminals of the individual energy storage elements from a common contact side is made possible. Such an embodiment of the present invention offers the advantage that contact to the contact terminals of the energy storage elements from the common contact side can take place in a manner that is very simple in technical terms. This permits, for example, an interconnection of multiple energy storage elements in a manner that is very simple in technical terms to implement, in order to obtain a complete energy storage unit that can provide the voltage and/or current levels necessary for operating the vehicle.

In another embodiment of the present invention, a step of mounting a contact bar between different contact terminals of energy storage units can also be provided. Such an embodiment of the present invention offers the advantage of connecting different contact terminals from different energy storage elements in order to thus permit, in a very flexible way, parallel or series connection of the energy storage elements, for example in the case of different required voltage or current levels for a load. Hence, in this way, energy storage elements with a low voltage can be used easily to produce high voltages required in the vehicle. The provision of energy storage elements with a low voltage is significantly more economical here than the provision of energy storage elements with a correspondingly high voltage. At the same time, however, it is possible to provide for the different application scenarios a uniform energy storage unit that can be equipped with the appropriate contact bars depending on the intended use.

Also, a step of mounting a cover can additionally be provided, wherein the cover is made and mounted such that an electrically conductive connection from a contact terminal of the at least one energy storage element to a jacket of the energy storage element is prevented. Such an embodiment of the present invention offers the advantage of protecting the energy storage elements from falling out while at the same time ensuring that a series electrical connection of the individual energy storage elements is made possible.

In addition, the insertion of the at least one energy storage element can take place in the insertion step in such a way that a jacket of the at least one energy storage element is connected in an electrically conductive manner to a contact terminal of the energy storage element. Such an embodiment of the present invention offers the advantage that a parallel connection of the individual energy storage elements becomes possible very simply. This parallel connection then requires only a connection of the first contact terminals of the individual energy storage elements (by means of a contact bar, for example), wherein the connection between the second contact terminals or a jacket of the energy storage element (and a part of the holder unit, for example) can serve as the second electrical terminal.

In addition, in the step of providing the holder unit, a holder unit can be provided that is designed to accommodate without play at least one energy storage element that has a honeycomb-shaped or round outer structure. Such an embodiment of the present invention offers the advantage that secure accommodation of the energy storage elements is possible. This prevents the energy storage elements from being damaged by slipping in the holder unit, for example as a result of motions caused by the travel of the vehicle. At the same time, avoiding movement of the energy storage elements in the holder unit ensures that contact with the contact terminals of the energy storage elements is reliably maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
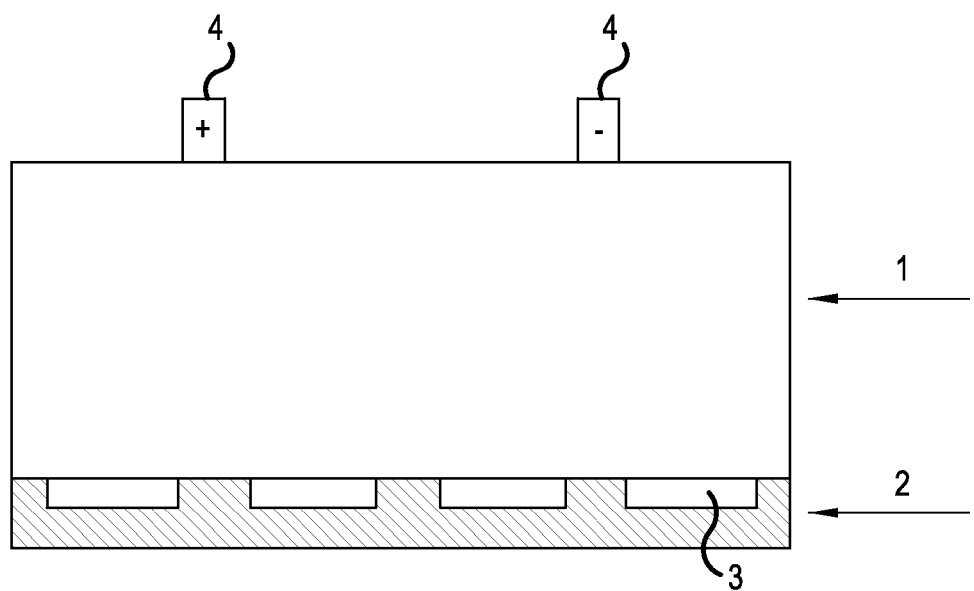
FIG. 1 illustrates a representation of a first exemplary embodiment of the present invention in a side view.

In the following description of the exemplary embodiments of the present invention, like or similar reference characters are used for the elements with similar effects shown in the different drawings, with a repeated description of these elements being omitted. Moreover, the drawing figures, the description thereof, and the claims contain numerous features in combination. It is clear to a person skilled in the art that these features can also be viewed individually and can also be brought together in additional combinations that are not explicitly described here. Furthermore, steps of the method according to the invention can be repeated and can also be carried out in a different order than the order described. If an exemplary embodiment includes an "and/or" conjunction between a first feature and a second feature, this may be read such that the exemplary embodiment in one form has both the first feature and the second feature, and in another form has either only the first feature or only the second feature.

FIG. 1 shows a representation of a first exemplary embodiment of the present invention in a side view, in which integration of the cooling plate into the cell housing takes place for a galvanic element as energy storage element.

First, a housing 1 (also referred to as a "holder unit") for the energy storage cells (e.g., the rechargeable or battery cells) is formed, for example from sheet aluminum. One or more housings 1 are now soldered together with the parts of at least one cooling plate 2, producing a rigid combination of the housing 1 and the cooling plate 2. As a result of the connection of the cooling plate 2 with the housing 1, cooling channels 3 that are formed in the cooling plate 2 and have been exposed are favorably closed in a fluid-tight manner. This can take place in such a way that the cell housing 1 forms a cover plate for the channel plate 2. Furthermore, an energy storage device holder produced in such a manner can now be populated with the individual energy storage elements, which have contact terminals 4 that project out of the energy storage device holder on a common contact side (for example, at the top in FIG. 1). Using such a production method, it is possible to obtain an energy storage unit such as is shown in a side view in FIG. 1.

Figure 2:
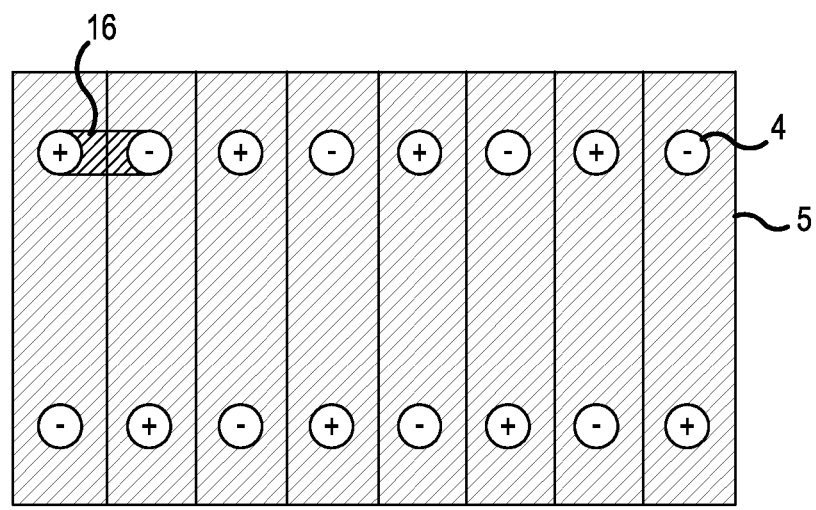
FIG. 2 is a representation of an exemplary embodiment of the present invention in a top view.

FIG. 2 shows a top view of the energy storage unit, wherein eight (energy storage) cells or elements 5 are inserted in the energy storage device holder next to one another. Filling with the electrode assembly and electrolytes then follows. The electrodes can be installed in the energy storage units in such a way that adjacent electrodes of different energy storage elements 5 have different polarities. In this way, series connection of the individual energy storage elements 5 is made possible in a very simple way, in that it is only necessary to connect two adjacent contact terminals 4 through very short connecting bars 16 in order to produce the energy storage unit.

Next, a cover can be provided and can be installed on the energy storage device holder populated with energy storage elements in such a way that no voltage is present at a jacket of the (energy storage) cell or multiple cells, so that the individual cells on the cooling plate 1 can also be connected in series. After forming, the cells are connected to one another, for example by means of contact bars, and are connected to protection electronics in a desired manner.

Figure 9:
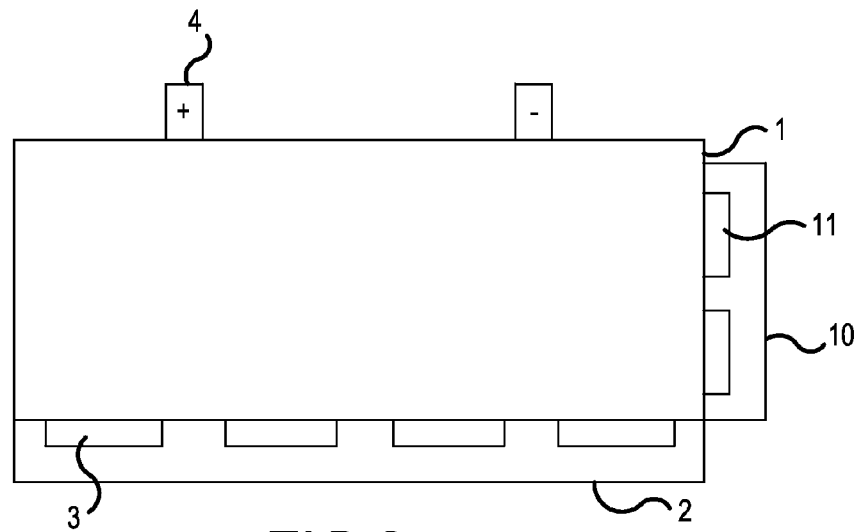
FIG. 9 is a side view of another exemplary embodiment of the present invention.
Figure 10:
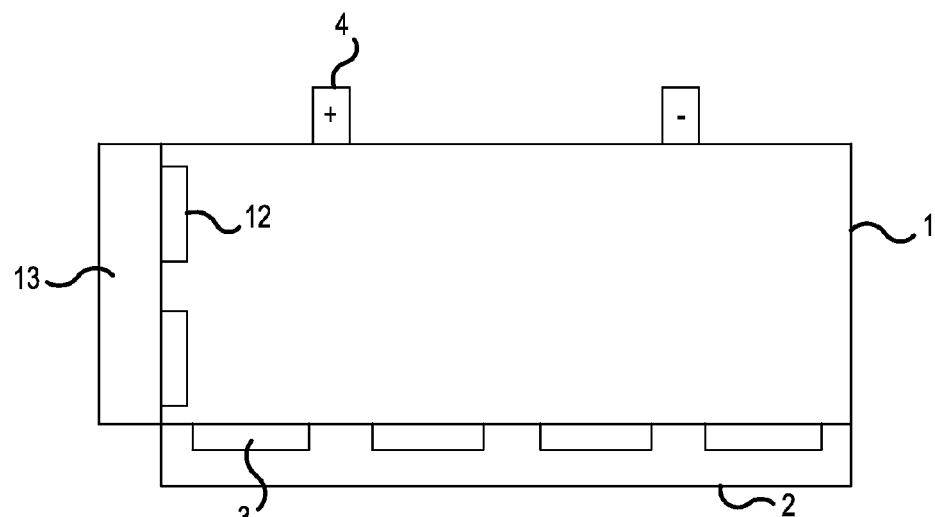
FIG. 10 is a side view of yet another exemplary embodiment of the present invention.
Figure 11:
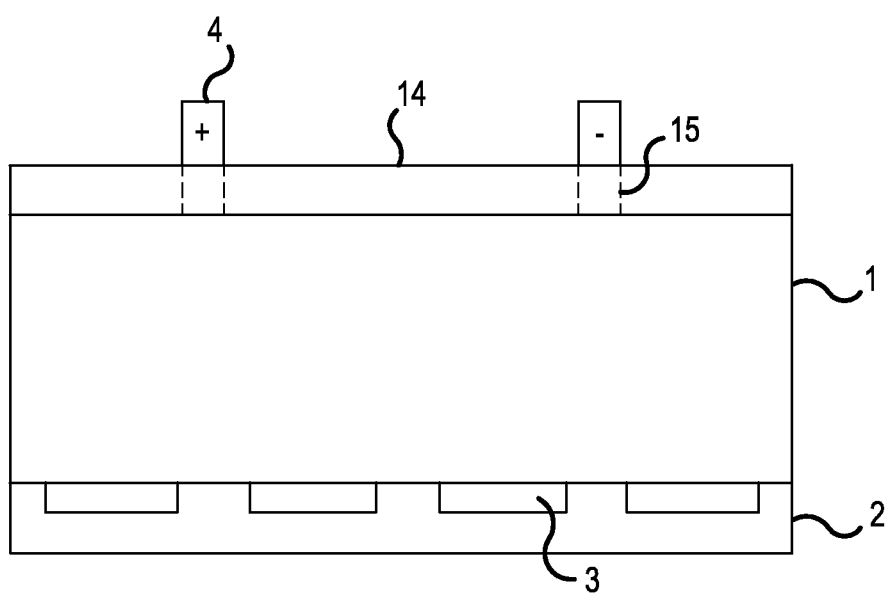
FIG. 11 is a side view of yet another exemplary embodiment of the present invention.

In addition to prismatic cells, it is also possible for, e.g., round cells as energy storage elements to be arranged in a honeycomb pattern on a cooling plate and held by the energy storage device holder. If only a parallel electrical connection is desired, a voltage can also be applied to the cell jacket that then represents a second electrical terminal or second contact terminal with respect to a first contact terminal. Multiple cooling plates can also be mounted on the holder unit 1, for example on the bottom and on one or more (outer) sides. As shown in the embodiment of FIG. 9, an additional cooling plate 10 is provided that has at least one additional cooling channel 11. The cooling channels 11 are closed by a side surface of the holder unit 1 during connection. With a recess for the contacts, this is also possible on the common contact side. Alternatively, as shown in the embodiment of FIG. 10, the housing 1 can also be formed with an exposed channel structure, wherein the exposed channels 12, which are designed to carry a cooling fluid during operation of the energy storage device holder, are closed by a cover plate 13, which is soldered on for example. As shown in the alternate embodiment of FIG. 11, an additional cooling plate 14 is provided having openings 15. The contact terminals 4 of the energy storage element are contacted through the openings 15 of the additional cooling plate 14.

As a result of the integration of the cooling function in the case of the energy storage elements, heat removal is improved, and cost and weight are improved as compared to a cell attached to a cooling plate.

Figure 3:
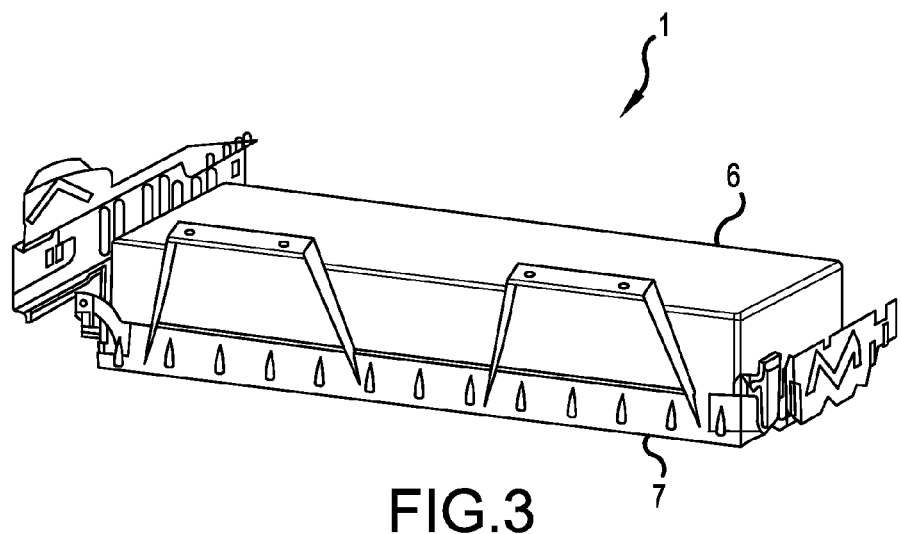
FIG. 3 is an isometric representation of a housing element of another exemplary embodiment of the present invention.

Another exemplary embodiment of the present invention as a housing part for accommodating energy storage elements is shown in isometric view in FIG. 3. In such an exemplary embodiment, the individual components, such as battery cells, frame, and electronic components, for example, should be accommodated by a holder, and at the same time the possibility for attachment to the body shell should be created. In addition, a housing that is to be provided should offer adequate protection against intrusions such as arise during accidents, in particular. In the particular case, the housing concept should also contain the cooling structure and hence perform the "cooling" function for the battery cells. The battery housing is considered as having two parts, the housing cover 6 and the housing base 7.

The housing cover 6 from FIG. 3 can be a plastic part made of, for example, prevalent technical plastic materials (such as fiber composite materials). This ensures cost-effective processing and an optimal weight solution. This achieves the required stability by lock-beading and connection to the housing base 7.

Figure 4:
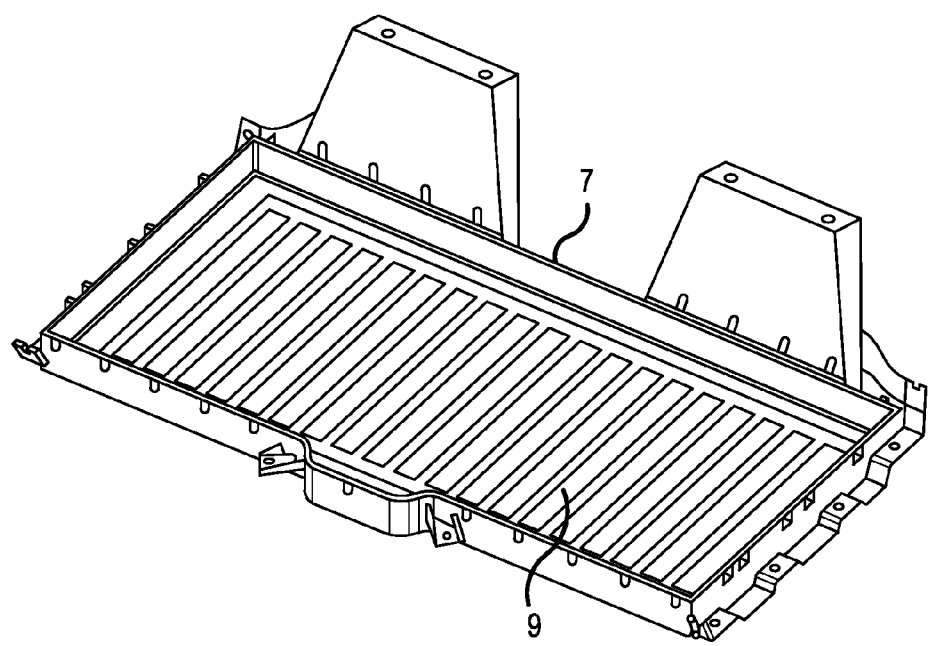
FIG. 4 is an isometric representation of a housing element of an exemplary embodiment of the present invention.

The housing base 7, as can be seen in the isometric representation in FIG. 4, for example, preferably should be made of materials such as high-strength steel, aluminum, magnesium, titanium, fiber-reinforced composite, plastic/metal hybrids, etc. The production of the housing base 7 should take place by a casting method insofar as possible. In this regard, the housing base 7 should be designed such that the required stiffness on the bottom is achieved by means of braces 8 (shown in FIG. 6).

Figure 5:
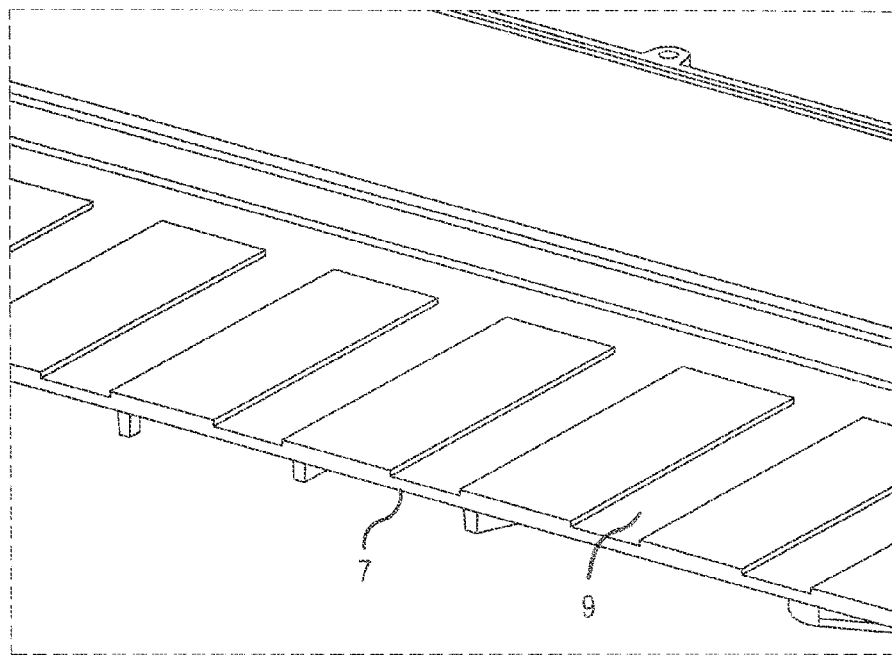
FIG. 5 is a cross-sectional view through a housing part according to an exemplary embodiment of the present invention.
Figure 6:
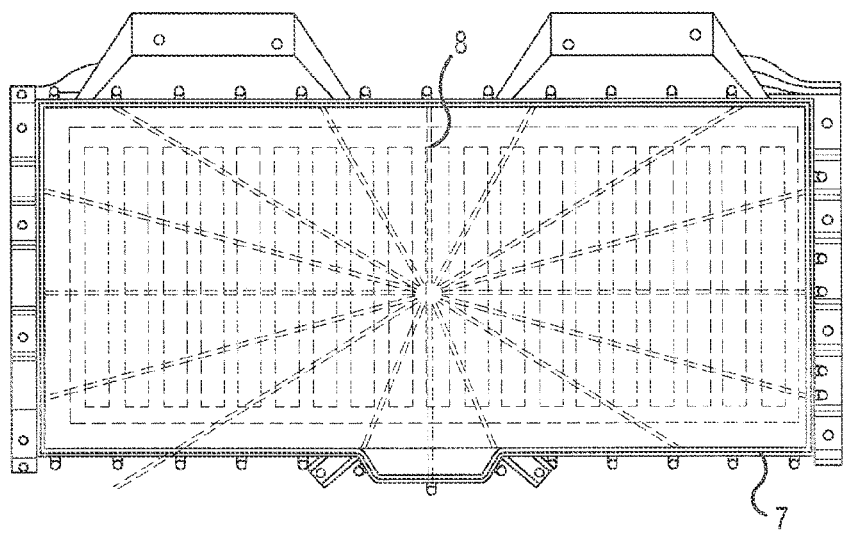
FIG. 6 is a top view of a housing part of an exemplary embodiment of the present invention.

The housing 1, which can comprise the housing cover 6 as depicted in FIG. 3 and the housing base 7 as depicted in FIG. 4, should be designed such that it is watertight and can be opened and closed again in a watertight manner. The housing should likewise include elements for pressure equalization and avoidance of condensation. The housing base 7 then has, for example, a cover plate and a cast support element that can accommodate the energy storage elements. Exposed on the top of the housing base 7 are the cooling channels 9, which are then closed in a fluid-tight manner by the mounting of a cover plate, for example. The two elements of cover plate and cast support element or housing base can be connected together in a continuous manner in a soldering process here. FIG. 5 shows an isometric cross-sectional view of an exemplary embodiment of the housing base 7. As shown in FIG. 5, the cooling channels 9 are formed by a recess in a surface of the base 7. FIG. 6 shows a top view of the housing base 7, with reinforcing braces 8 on one side of the base 7 rendered in dashed lines.

The advantages of such an exemplary embodiment of the invention reside in the light construction of the concept and in the high integration of functions. In this way, functions such as holding and securing the above-mentioned components can be achieved. All car body attachment points should be included in the housing base. In spite of the light construction, the high mass of the battery or rechargeable cells of up to 200 kg can be supported.

Integration into the chassis assembly process is made possible by skillful routing of the plane of separation between the housing cover and the housing base. The primary advantage of such an exemplary embodiment of the invention in this regard resides in the combination of the support structure with the cooling structure.

Figure 7:
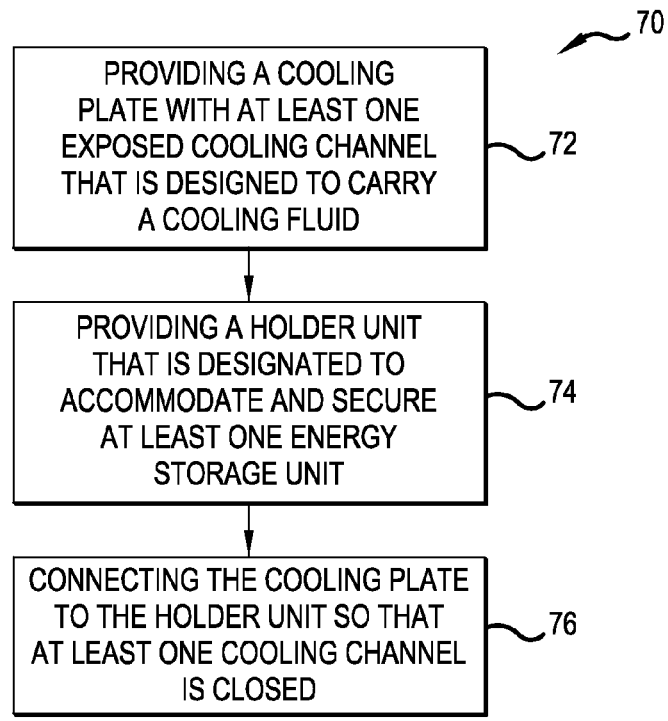
FIG. 7 is a flow chart of an exemplary embodiment of the present invention as a method.

FIG. 7 shows a flow chart of an exemplary embodiment of the invention as a method 70 for producing an energy storage device holder for a vehicle. The method 70 includes a step 72 of providing a cooling plate with at least one exposed cooling channel that is designed to carry a cooling fluid. The method also has a step 74 of providing a holder unit that is designed to accommodate and secure at least one energy storage unit. Lastly, the method 70 includes a step 76 of connecting the cooling plate to the holder unit, by which means the at least one cooling channel is closed.

Figure 8:
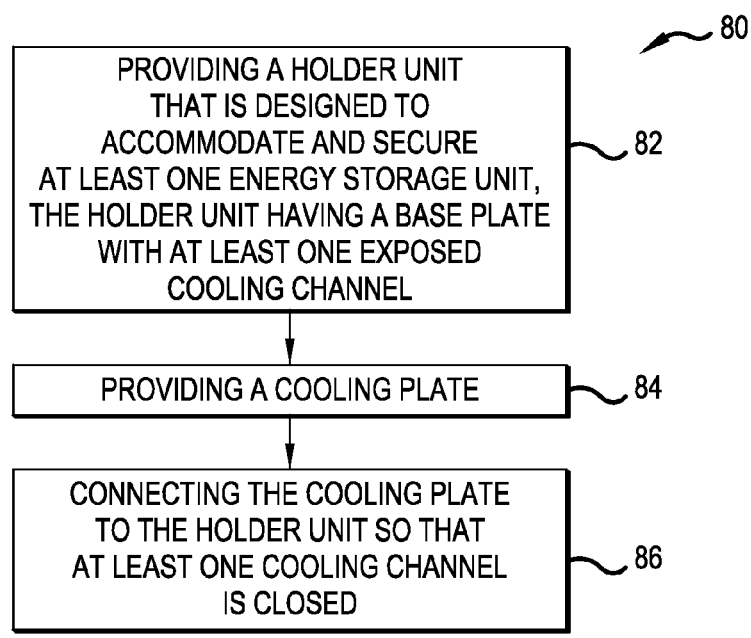
FIG. 8 is another flow chart of an exemplary embodiment of the present invention as a method.

FIG. 8 shows a flow chart of an exemplary embodiment of the invention as a method 80 for producing an energy storage device holder for a vehicle. The method 80 includes a step 82 of providing a holder unit that is designed to accommodate and secure at least one energy storage unit and that has a base plate with at least one exposed cooling channel that is designed to carry a cooling fluid. The method 80 also has a step 84 of providing a cooling plate, and a step 86 of connecting the cooling plate to the holder unit, by which means the at least one cooling channel is closed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing an energy storage device holder for a vehicle, the method comprising:
   providing a holder unit that is configured to accommodate and secure at least one energy storage unit, the holder unit having a cover member and a base plate, the base plate being formed of a single, uniform structure and having at least one exposed cooling channel provided therein, the at least one exposed cooling channel being a recess in a surface of the base plate that is adapted to carry a cooling fluid,
   wherein the recess penetrates partly through the base plate;
   providing a cooling plate; and
   connecting the cooling plate to the holder unit via which the at least one exposed cooling channel is closed,
   wherein the holder unit entirely surrounds side surfaces of the at least one energy storage unit.

2. The method according to claim 1, wherein, during the step of providing the holder unit, a holder unit is provided that has on a side surface at least one additional exposed cooling channel that is also closed by an additional provided cooling plate during the connection step.

3. The method according to claim 1, wherein the base plate has a metal or metal constituents, steel, aluminum, magnesium, titanium, or a plastic/metal hybrid.

* * * * *